United States Patent
Malfent et al.

(10) Patent No.: US 6,834,909 B1
(45) Date of Patent: Dec. 28, 2004

(54) DOOR FASTENING

(75) Inventors: Thomas Malfent, Vienna (AT); Martin Kronateber, Freundorf (AT)

(73) Assignee: Siemens SGP Verkehrstechnik GmbH, Vienna (AT)

( * ) Notice: Subject to any disclaimer, the term of this patent is extended or adjusted under 35 U.S.C. 154(b) by 0 days.

(21) Appl. No.: 10/363,002

(22) PCT Filed: Jul. 25, 2001

(86) PCT No.: PCT/AT01/00256

§ 371 (c)(1),
(2), (4) Date: May 27, 2003

(87) PCT Pub. No.: WO02/18735

PCT Pub. Date: Mar. 7, 2002

(30) Foreign Application Priority Data

Aug. 31, 2000 (AT) ..................... A 1494/2000

(51) Int. Cl.[7] .................................. B60J 7/00
(52) U.S. Cl. ................ 296/138; 296/155; 296/146.9
(58) Field of Search .......................... 296/138, 190.11, 296/193.05, 202, 155, 146.9, 146.5; 16/94 R; 49/213, 449

(56) References Cited

U.S. PATENT DOCUMENTS

| 1,798,180 A | * | 3/1931 | Tobin et al. ............... 16/94 R |
| 4,438,969 A | * | 3/1984 | Kamijo et al. ............ 296/146.9 |
| 4,503,638 A | * | 3/1985 | Schindehutte ................ 49/213 |
| 4,544,198 A | * | 10/1985 | Ochiai et al. ................ 296/155 |
| 4,956,943 A | * | 9/1990 | Yamada et al. .......... 296/146.9 |
| 4,984,842 A | * | 1/1991 | Ogawa et al. ............... 296/155 |
| 4,991,905 A | * | 2/1991 | Watanabe et al. ........... 296/155 |
| 5,148,631 A | * | 9/1992 | Bayard et al. ................. 49/449 |
| 5,967,595 A | * | 10/1999 | Heya et al. .................. 296/155 |
| 6,079,767 A | * | 6/2000 | Faubert et al. ............... 296/155 |
| 6,155,630 A | * | 12/2000 | Fukumoto et al. .......... 296/155 |
| 6,231,112 B1 | * | 5/2001 | Fukumoto et al. ....... 296/146.5 |
| 6,530,619 B2 | * | 3/2003 | Fukumoto et al. ........... 296/155 |

FOREIGN PATENT DOCUMENTS

| DE | 2932730 | * | 8/1979 |
| JP | 6175017 | * | 4/1986 |
| JP | 6317113 | * | 1/1988 |
| JP | 999862 | * | 4/1997 |

* cited by examiner

Primary Examiner—Kiran Patel
(74) Attorney, Agent, or Firm—Sutherland Asbill & Brennan LLP

(57) ABSTRACT

The invention relates to a side panel (2) of a motor vehicle, comprising at least one opening (5) that can be closed with a cover. Said cover is slideably received in at least one guide rail (9) and at least one support (10) is provided that carries the guide rail (9) and that is linked with both the guide rail (9) and the side panel (2).

10 Claims, 3 Drawing Sheets

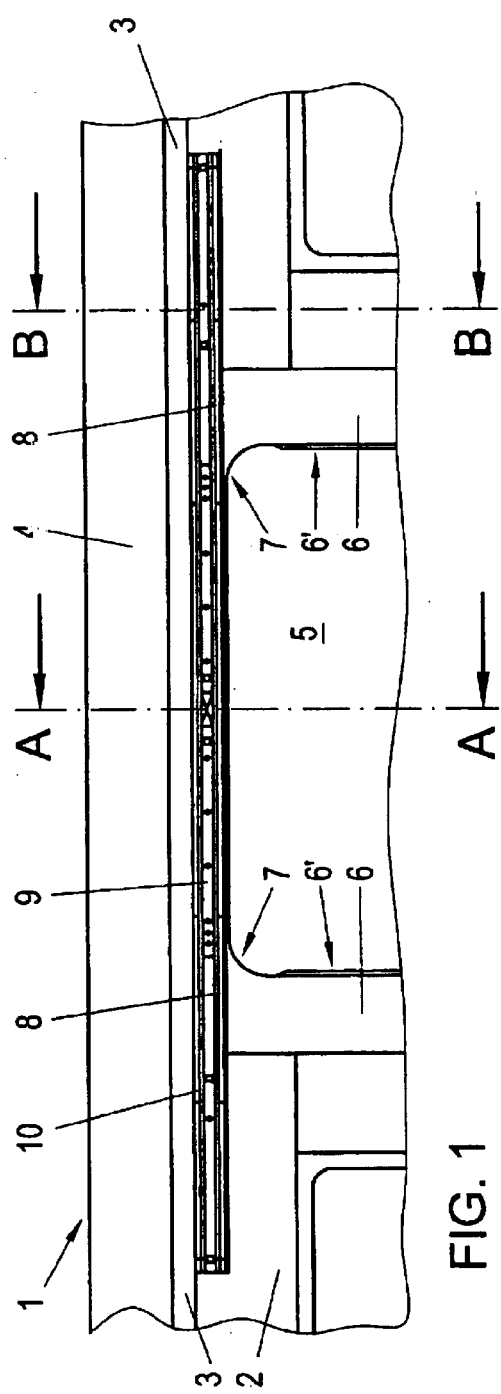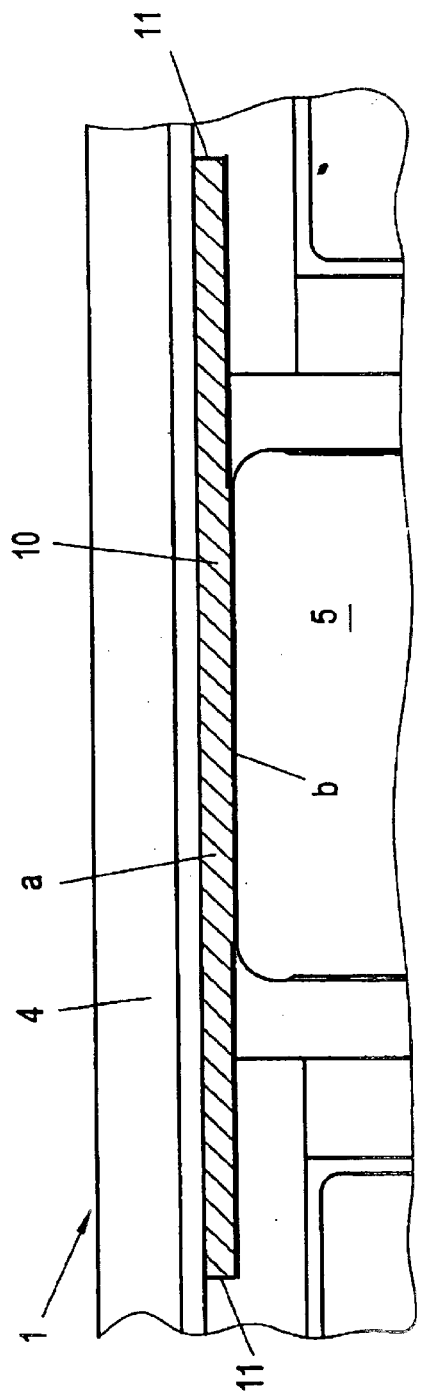

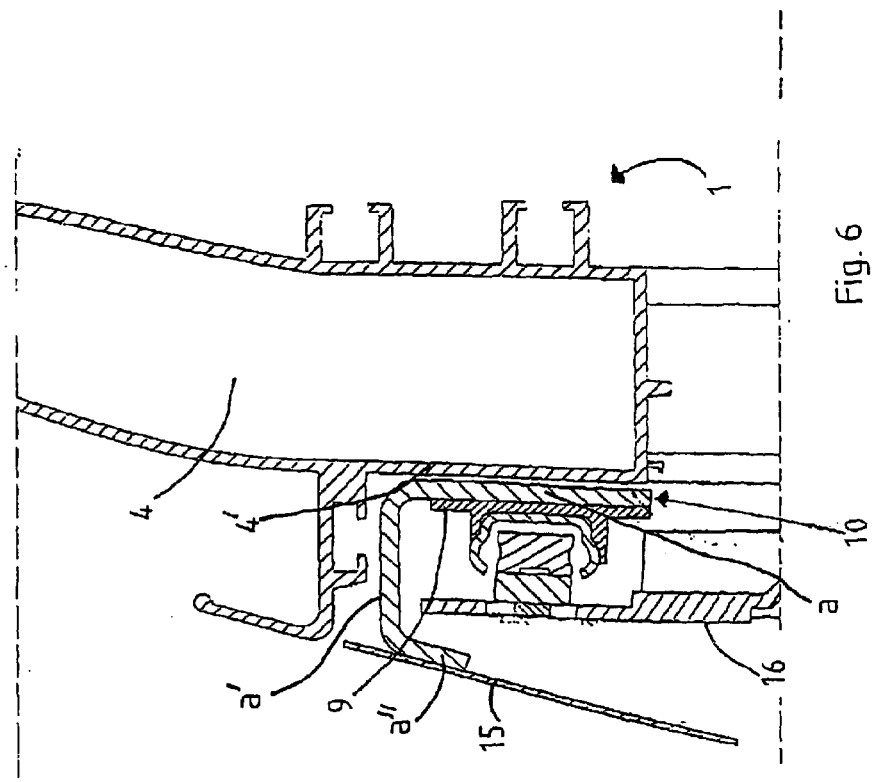
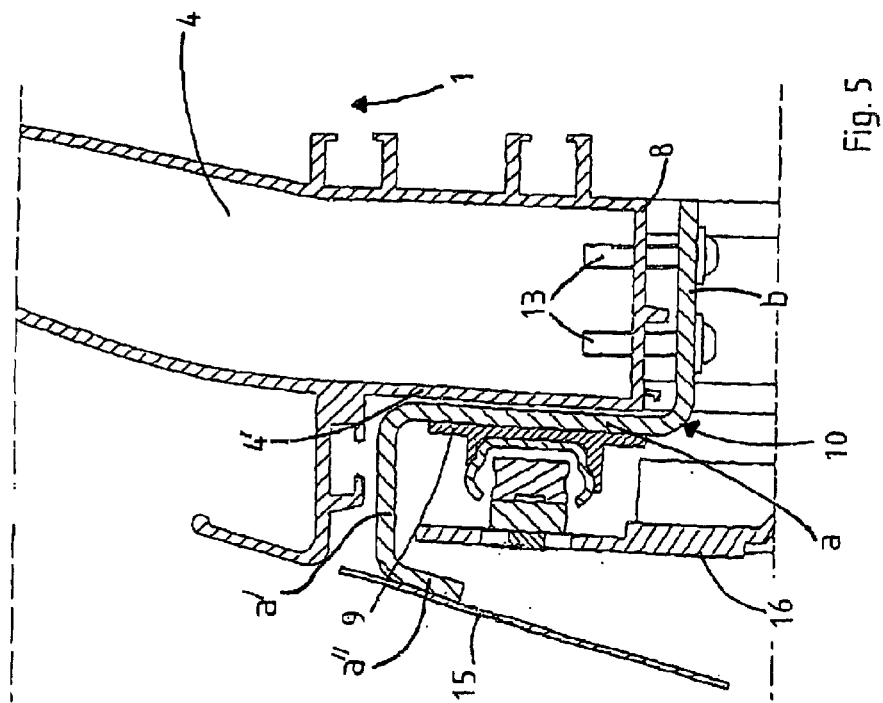

DOOR FASTENING

CROSS-REFERENCE TO RELATED APPLICATIONS

This is a submission pursuant to 35 U.S.C. 154(d)(4) to enter the national stage under 35 U.S.C. 371 for PCT/AT01/00256, filed Jul. 25, 2001. Priority is claimed under 35 U.S.C. 119(a) and 35 U.S.C. 365(b) to Austrian Patent Application No. A 1494/2000, filed Aug. 31, 2000.

The invention relates to a sidewall of a vehicle having at least one opening which can be closed by means of at least one cover, wherein the cover is displaceably mounted in at least one guide rail, and disposed between the guide rail and the sidewall is at least one auxiliary support which is connected both to the sidewall and to the guide rail.

The invention also relates to a use of an auxiliary support in a vehicle.

In the case of walls of the type stated in the introduction, the loadings which occur during practical operation can produce deformations which by reason of the direct connection of the guide rail can be transmitted to said guide rail, whereby it is no longer possible to guarantee that the opening can be opened and closed in a problem-free manner by means of a cover. Above all, in the case of rail-borne vehicles and ships it is possible for the situation to arise that as a result door openings, cargo hatchways etc., which can be closed by means of a cover mounted in a guide rail, e.g. a sliding door, can no longer be closed with the required degree of sealing-tightness.

For example, in connection with sliding walls/panels DE 299 22 481 U1 is known which describes a device from the domain of residential construction for the movable arrangement of a sliding door in front of a door opening which comprises a frame and has a running rail in which running rollers of the sliding door can be moved. The running rail is held by several holders, wherein at least some of the holders are attached to a lining board of the frame between the frame and wall. By reason of the fact that it is complicated to achieve the known solution, the said solution is associated with extremely high costs. Above all, with regard to the small amount of leeway in production costs as a result of competition, it is only possible to justify the outlay which is absolutely necessary in the production of sliding doors in vehicle construction.

DE 299 06 739 describes a suspension device for a displaceable closing element having a running rail, which extends in the direction of displacement, for the closing element and having an intermediate rail, which extends along the running rail, for the purpose of attaching the running rail to a construction element of a house. The intermediate rail is connected by way of a connection support to the construction element U.S. Pat. No. 4,073,034 describes a door-support system for sliding doors, in particular for lift doors, wherein a door frame which protrudes beyond the wall is provided with an L-shaped auxiliary support, on which in turn a running rail is disposed. This document also makes no reference as to how to prevent the introduction of deformation forces in a running rail of a vehicle, so that the door does not have to be readjusted. A disadvantage of the known design is primarily that it is necessary to provide a door frame which is disposed in front of the wall and to which the auxiliary support can be attached. As it is generally the case that vehicles are not provided with this type of door frame which is disposed in front of a vehicle wall, this design is not suitable for vehicle construction.

EP 0 343 351 A1 discloses a sliding door arrangement having a sliding door, in particular for lift doors, which is disposed in such a manner as to be able to move in a running rail, wherein the running rail can be attached to a base.

U.S. Pat. No. 1,768,060 A discloses a sliding door for a sidewall of a vehicle, e.g. a rail-borne vehicle, wherein the sliding door is displaceably mounted on an upper guide rail by means of rollers. The guide rail is formed in a T-shaped manner, wherein the rear part of the guide rail faces the sidewall, so that the free limb of the guide rail which extends perpendicularly with respect to the rear part protrudes outwardly and forms a rolling surface for the rollers of the sliding door. At its upper end region allocated to the guide rail, the sliding door comprises a Z-shaped stop element which engages under the rear part of the T-shaped guide rail, thus preventing the sliding door from tilting away from the sidewall or thus ensuring guidance of the sliding door. In order to be able to dispose the Z-shaped stop element, which is required for reasons of design, between the guide rail and the sidewall, the guide rail must be spaced apart from the sidewall. For this purpose, an auxiliary support which is formed as an angular element is provided between the guide rail and the sidewall of the rail-borne vehicle and is attached with a limb to the upper side of a longitudinal support or door profile, wherein a second limb extends in parallel with an outer side of the longitudinal support. The guide rail is connected to the limb of the auxiliary support connected in parallel with respect to the outer side, but protrudes in parallel with the outer side of the longitudinal support beyond said longitudinal support, so that the required space installation space [sic] for the Z-shaped stop element is provided between the longitudinal support and the guide rail.

GB 2 166 789 A discloses a sidewall of a vehicle which comprises a door opening which can be closed by means of a sliding door displaceably mounted in a guide rail with a U-shaped profile. The guide rail is in direct contact with a longitudinal roof support or the sidewall. A disadvantage of the known solution is primarily that by reason of the direct contact between the longitudinal roof support or sidewall and the guide rail it is possible for deformation forces to be transmitted from the sidewall to the guide rail.

U.S. Pat. No. 1,798,180 A describes a sliding door which is displaceably mounted on a guide rail. The guide rail is supported on a projection of the sidewall and can be connected directly thereto. In the illustrated embodiment, the guide rail can be connected to the sidewall by means of a z-shaped auxiliary support in order to protect the corners of the sidewall. The auxiliary support is connected in this case to the upper side of a profile of the sidewall.

Problems which are associated with the deformation of the running rail are conventionally solved by the temporary readjustment of the cover and of the guide rail. However, a disadvantage of this solution is the high maintenance outlay and the associated high costs.

Therefore, it is an object of the invention to provide a way of dispensing with the readjustment of the cover plate settings without impairing the functionality of the displaceable cover plate. It is also an object of the invention to provide a way of enabling the guide rail to remain free of deformation in the event of loadings which act upon the sidewall.

This object is achieved in accordance with the invention with a sidewall of a vehicle of the type stated in the introduction by virtue of the fact that the guide rail is completely spaced apart from the sidewall by means of the auxiliary support and at least sections of the at least one auxiliary support are connected to lateral profiles and/or to the underside of an upper profile of the opening.

The invention renders it possible to prevent wall deformations or deformation forces from being transmitted to the cover, since the arrangement of the auxiliary support serves to prevent these loadings from being introduced into the guide rail.

In accordance with one advantageous embodiment of the invention, it is provided that the opening comprises two lateral profiles which are mutually connected at their upper end regions by means of an upper profile, wherein at least sections of the auxiliary support arm connected to the guide rail and to the upper profile. In the case of this embodiment, it is possible in a particularly effective manner to prevent the introduction of deformation forces, which act upon the sidewall, into the guide rail by virtue of the fact that the auxiliary support is formed in its middle region as an angular support having at least one limb which extends in parallel with the underside of the upper profile and this region of the auxiliary support is connected at least in sections to the underside of the upper profile, wherein regions of the auxiliary support disposed outside the region of the opening extend at a spaced interval from the sidewall.

The attachment of the at least one guide rail to the auxiliary support can be improved by virtue of the fact that the auxiliary support is substantially the same length as the upper guide rail.

In one advantageous embodiment, the auxiliary support is screwed to the upper profile and to the at least one guide rail.

For reasons of reducing weight and of simplifying production, the auxiliary support is formed as an aluminium profile.

In another advantageous embodiment, it is provided that the auxiliary support is manufactured from special steel.

In one embodiment of the invention which is very significant in practice, the wall is formed as a sidewall of the superstructure of a rail-borne vehicle.

The above-described object is also achieved by the use of an auxiliary support in a vehicle in that it is disposed between the guide rail and the sidewall in order to minimise the deformation forces which are transmitted from a sidewall of a vehicle to a guide rail, in which is displaceably mounted at least one cover of at least one opening in the sidewall.

The invention together with further advantages is explained in detail hereinunder with reference to some non-limiting exemplified embodiments which are schematically illustrated in the attached drawing, in which FIG. 1 shows a side view of a section of an inventive sidewall of a vehicle;

FIG. 2 shows the sidewall of FIG. 1 having an auxiliary support in accordance with the invention;

FIG. 5 shows a section along the line A—A in FIG. 1 of a second embodiment of the invention; and FIG. 6 shows a section along the line B—B in FIG. 1 of a second embodiment of the invention.

Figure 4:
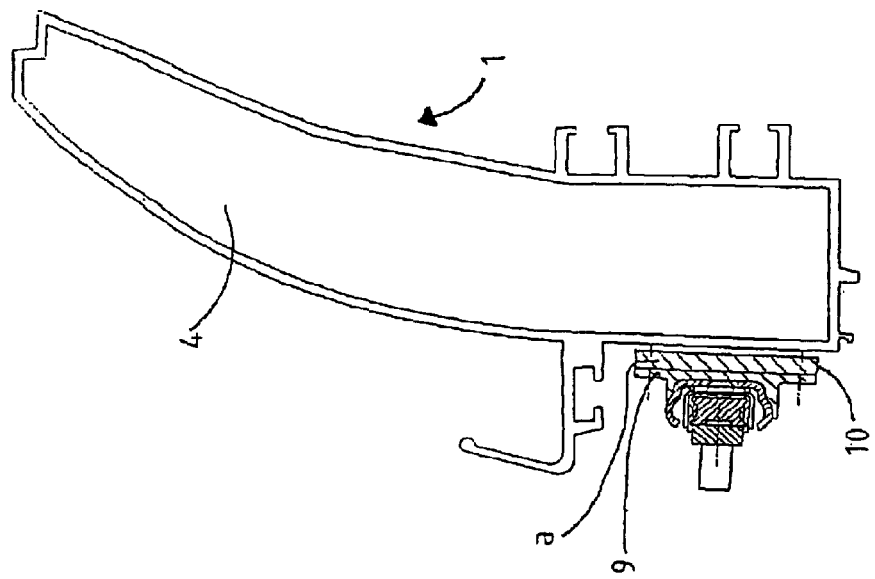
FIG. 4 shows a section along the line B—B in FIG. 1 of a first embodiment of the invention.

As shown in FIG. 1, an inventive sidewall 2 of a vehicle 1, in particular of a rail-borne vehicle, comprises on its upper ends 3 a longitudinal roof support 4 which serves to support a roof construction.

In order to enable passengers to board and alight or to allow goods to be loaded and unloaded, the sidewall 2 is provided with an opening 5 which can be opened and closed respectively by means of a cover, in this case a sliding door which is not shown in this case for illustrative reasons. On its lateral end regions 6', the opening 5 comprises two lateral profiles 6 which extend perpendicularly with respect to the underside of the longitudinal roof support 4 and whose upper end regions 7 are mutually connected by means of an upper profile 8.

For the purpose of guiding the sliding door, there are provided a lower and an upper guide rail 9, wherein in this case only the upper guide rail 9 is illustrated. In order to attach this guide rail 9 to the sidewall 2, there is provided an auxiliary support 10 which is substantially the same length as the guide rail 9 and for reasons of reducing weight can be formed as an aluminium profile. However, the auxiliary support 10 can also be produced from other materials, e.g. special steel.

Figure 3:
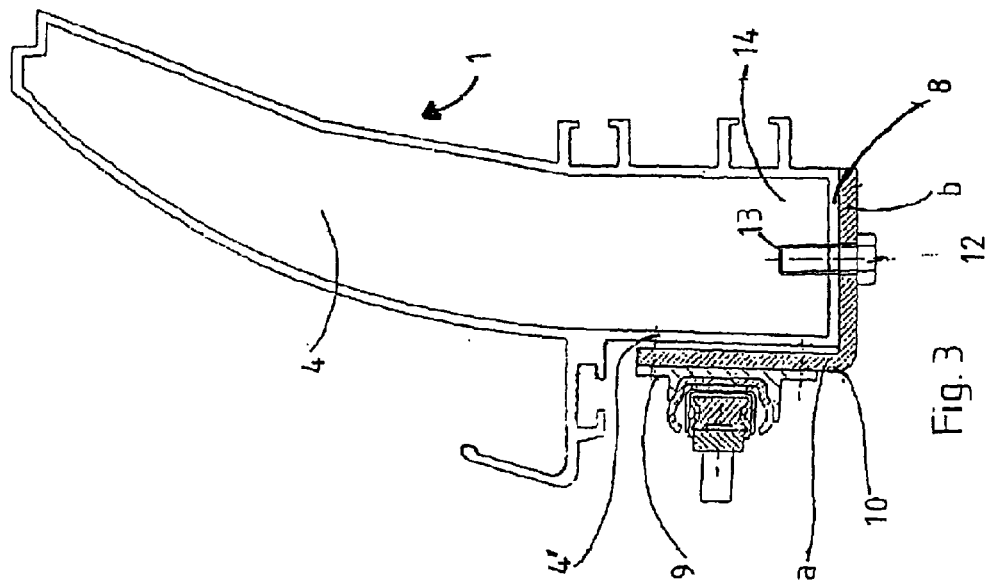
FIG. 3 shows a section along the line A—A in FIG. 1 of a first embodiment of the invention.

The auxiliary support 10 is disposed substantially between the sidewall 2 and the upper guide rail 9. On the wall-side, the auxiliary support 10 can be connected — preferably screwed—in the region of the opening 5 to the underside of the upper profile 8, for this purpose the auxiliary support 10 can comprise a limb b which is allocated to the underside of the profile 8 and is illustrated in FIGS. 2, 3 and 5.

This arrangement renders it possible to decouple the deformation forces, which act upon the sidewall 2 during practical operation, substantially completely from the guide rail 9. Numerous tests have shown namely that only negligible deformations occur in the region of the upper profile 8 when subject to loadings, as can occur during practical operation. Another way of attaching the auxiliary support 10 to the sidewall 2 is to connect it to the lateral profiles 6.

In principle, the auxiliary support 10 can, however, be attached to any point of the sidewall 2, at which no deformations occur when subject to loadings. The position of these points depends inter alia upon the shaping of the wall and can take various positions on different walls. These points can be determined by calculations or experiments.

In accordance with FIG. 2, the auxiliary support 10 is disposed on the outer side of the vehicle 1 substantially in parallel with the longitudinal roof support 4. In the embodiment of the invention illustrated in this case, a portion of the longitudinal roof support 4 which is located in the region of the opening 5 between the lateral profiles 6 is provided as an upper profile 8.

In order to ensure an effective connection to the longitudinal roof support 4, the auxiliary support 10, as already mentioned above, comprises at a spaced interval from its ends 11 a limb b which is allocated to the underside of the longitudinal roof support 4, is illustrated in more detail in FIGS. 3 and 5 and extends substantially in parallel with the underside of the longitudinal roof support 4.

The upper guide rail 9 illustrated in FIG. 1 can even be connected within the scope of production to the auxiliary support 10 and be adjusted ready for operation, wherein the guide rail 9 is screwed to the auxiliary support 10 for manufacturing technology reasons, although other types of connection are also possible in principle. The guide rail 9 can be attached to a plate-shaped portion a of the auxiliary support 10 which is specifically provided for this purpose and extends substantially perpendicularly with respect to the limb b which is allocated to the underside of the upper profile 8. Then, for mounting on the vehicle 1, the auxiliary support 10 only has to be attached to the upper profile 8.

The height tolerances which occur when mounting the sliding door on the vehicle 1 can be compensated for by means of a suitable arrangement and design of the lower guide rail.

In accordance with FIG. 3, the first portion a of the auxiliary support 10 extends at a spaced interval from the longitudinal roof support 4 and extends at least approximately in parallel with its outer sidewall 4' and the guide rail 9, wherein the length of this portion a in parallel with the longitudinal extension of the vehicle 1 corresponds substantially to the longitudinal extension of the guide rail 9 in this direction. The limb b which is allocated to the underside of the longitudinal roof support 4 and extends perpendicularly with respect to the first portion a is disposed in the middle region of the auxiliary support 10 and comprises a longitudinal extension which corresponds substantially to the distance between the two lateral profiles 6.

The limb b of the auxiliary support 10 and the lower end region 14, which is located in the region of the opening 5, of the longitudinal roof support 4 which as already mentioned above is provided as an upper profile 8 in the embodiment illustrated here, are mutually connected by means of screws 13. In the embodiment illustrated in this case, the longitudinal roof support 4 is designed as a hollow support. In order to fix the screw 13, which projects into the inner space of the hollow support, it is possible to provide a nut at this site. In the case of an embodiment as an aluminum profile, at the points where a screw is provided, the longitudinal roof support 4 can comprise an extension which protrudes into the hollow space of the support and into which the screw 13 can be screwed.

For reasons relating to manufacturing technology, it is preferred to screw the auxiliary support 10 to the longitudinal roof support 4 as opposed to other types of connection, although these are possible in principle.

In accordance with FIG. 4, outside the region of the opening 5 the auxiliary support 10 comprises only the portion a which extends substantially in parallel with the longitudinal roof support 4 and is not directly connected to the longitudinal roof support 4 and extends at a spaced interval with respect thereto.

In the case of the embodiment of the invention as shown in FIG. 5 and FIG. 6, in the region of the opening 5 of the vehicle 1, the auxiliary support 10 likewise comprises a limb b which is allocated to the underside of the upper profile 8. Provided in parallel with the outer side surface 4' of the longitudinal roof support 4 is a portion a which, as already mentioned above, serves for mounting of the guide rail 9 but which, at its end facing the roof construction, becomes a portion a' which extends substantially perpendicularly with respect to the wall 2. Following on from this portion a', the auxiliary support 10 comprises a portion a" which extends at a spaced interval from the wall 2 and is inclined with respect to the wall 2 and which is provided with a protective plate 15 for the purpose of protecting the upper guide rail 9 and a sliding door 16.

In the case of the embodiments of the invention described above, the guide rail 9 is attached to the auxiliary support 10, as shown clearly in the illustrations. Since the region of the opening 5 is a region substantially free of any deformations, in the case of the exemplified embodiment shown here it is not possible for any deformation forces to be transmitted to the guide rail 9.

What is claimed is:

1. A vehicle sidewall comprising:
   at least one opening which can be closed by means of at least one cover;
   at least one cover for closing said opening;
   at least one guide rail in which said cover is displaceably mounted;
   at least one auxiliary support disposed between the guide rail and the sidewall, which support is connected both to the sidewall and to the guide rail,
   wherein the guide rail is completely spaced apart from the sidewall by means of the auxiliary support and at least sections of the at least one auxiliary support are connected to (i) lateral profiles, (ii) to the underside of an upper profile of the opening, or (iii) to both lateral profiles and the underside of the upper profile of the opening.

2. The vehicle sidewall of claim 1, wherein the auxiliary support is formed in its middle region as an angular support having at least one limb which extends in parallel with the underside of the upper profile of the opening.

3. The vehicle sidewall of claim 1, wherein the at least sections of the middle region of the auxiliary support are connected to the underside of the upper door profile, and wherein regions of the auxiliary support which are disposed outside the region of the door opening extend at a spaced interval from the sidewall.

4. The vehicle sidewall of claim 1, wherein the auxiliary support is substantially the same length as the guide rail.

5. The vehicle sidewall of claim 1, wherein the auxiliary support is screwed or bolted to the upper profile.

6. The vehicle sidewall of claim 1, wherein the auxiliary support is screwed or bolted to the guide rail.

7. The vehicle sidewall of claim 1, wherein the auxiliary support is formed as an aluminum profile.

8. The vehicle sidewall of claim 1, wherein the auxiliary support is manufactured from steel.

9. The vehicle sidewall of claim 1, which is formed as a sidewall of the superstructure of a rail-borne vehicle.

10. A method of minimizing the deformation forces which are transmitted from a sidewall of a vehicle to a guide rail in which is displaceably mounted at least one cover of at least one opening in the sidewall, the method comprising:
   providing an auxiliary support disposed between the guide rail and the sidewall, wherein the support is effective to minimize the deformation forces which are transmitted from the sidewall to the guide rail.

* * * * *